(12) United States Patent
Gianazza et al.

(10) Patent No.: US 9,341,419 B2
(45) Date of Patent: May 17, 2016

(54) CORROSION-RESISTANT BIMETALLIC TUBE AND ITS USE IN TUBE BUNDLE EQUIPMENT

(75) Inventors: Alessandro Gianazza, Legnano (IT); Luca Mairano, Milan (IT); Giuseppe Merelli, Vertova (IT); Domenico Sanfilippo, Paullo (IT)

(73) Assignee: SNAMPROGETTI S.p.A., San Donato Milanese (IT)

( * ) Notice: Subject to any disclaimer, the term of this patent is extended or adjusted under 35 U.S.C. 154(b) by 1626 days.

(21) Appl. No.: 11/761,735

(22) Filed: Jun. 12, 2007

(65) Prior Publication Data

US 2008/0093064 A1    Apr. 24, 2008

(30) Foreign Application Priority Data

Jun. 26, 2006    (IT) ............................. MI2006A1223

(51) Int. Cl.
| | |
|---|---|
| F28F 19/00 | (2006.01) |
| F28F 9/18 | (2006.01) |
| F28F 21/08 | (2006.01) |
| F16L 13/02 | (2006.01) |
| F28F 19/06 | (2006.01) |

(52) U.S. Cl.
CPC ........... *F28F 21/084* (2013.01); *F16L 13/0236* (2013.01); *F28F 9/18* (2013.01); *F28F 19/06* (2013.01); *F28F 2275/062* (2013.01); *F28F 2275/068* (2013.01); *Y10T 29/49718* (2015.01)

(58) Field of Classification Search
CPC ......... F28F 9/185; F28F 19/002; F28F 19/06; F28F 21/086
USPC ............... 165/158, 134.1, 133, 178, 180, 905
See application file for complete search history.

(56) References Cited

U.S. PATENT DOCUMENTS

| | | | | | |
|---|---|---|---|---|---|
| 4,333,597 | A | * | 6/1982 | Hardwick | ...................... 228/108 |
| 4,504,729 | A | * | 3/1985 | Asano | ....................... 219/137 R |
| 4,899,813 | A | | 2/1990 | Menicatti et al. | |
| 5,363,613 | A | * | 11/1994 | Sevier | .............................. 52/263 |
| 2005/0150640 | A1 | * | 7/2005 | Nadig | ............................ 165/141 |
| 2006/0027628 | A1 | | 2/2006 | Suther et al. | |
| 2006/0032620 | A1 | * | 2/2006 | Gandolfi et al. | ............... 165/133 |

FOREIGN PATENT DOCUMENTS

| | | | | |
|---|---|---|---|---|
| EP | 1577632 A1 | * | 9/2005 | ................. 165/134.1 |
| SU | 1763131 A1 | * | 9/1992 | |

* cited by examiner

*Primary Examiner* — Leonard R Leo
(74) *Attorney, Agent, or Firm* — Oblon, McClelland, Maier & Neustadt, L.L.P.

(57) ABSTRACT

A bimetallic tube consisting of at least one tubular element in a first metal resistant to the corrosive and/or erosive action of a process fluid with which it is put in contact, having at least one end, or an area close to an end, externally coated with a layer of a second metal, different from the first and more suitable, with respect to this, for being seal-welded to a support.
Tube bundle equipment to be used for thermal exchange operations at high temperatures and pressures, under conditions of high aggressiveness of the process fluids, wherein the tube bundle comprises at least one tube having the above characteristics.
Said equipment is particularly used as a heat exchanger and decomposer, for example as a stripper, in the cycle of urea synthesis processes where there are conditions of high pressure, high temperatures, high aggressiveness of the process fluids, and in which the tube bundle consists of at least one tube having the above characteristics.

8 Claims, 3 Drawing Sheets

CORROSION-RESISTANT BIMETALLIC TUBE AND ITS USE IN TUBE BUNDLE EQUIPMENT

Figure 1:
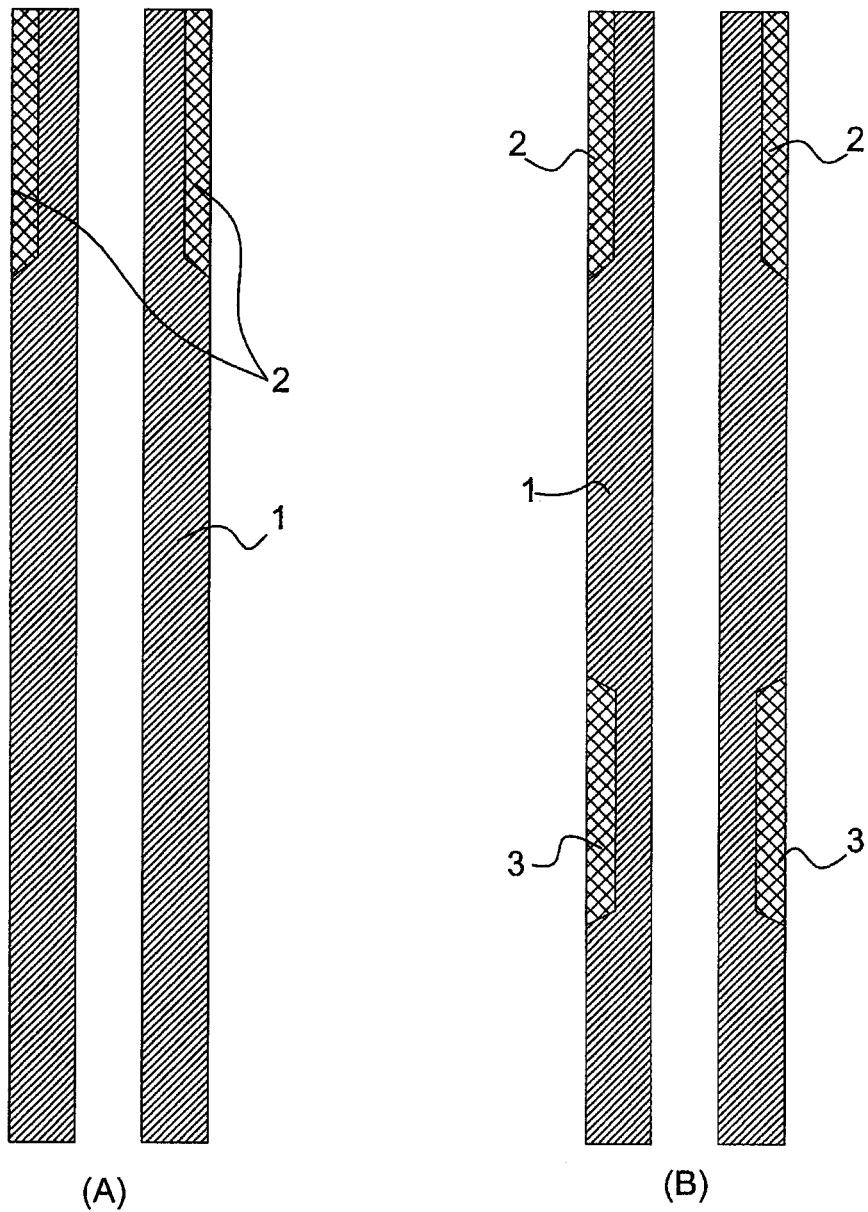

The present invention relates to a corrosion-resistant bimetallic tube and its use for the production of tube bundle equipment.

More specifically, the present invention relates to a bimetallic tube consisting of a metal resistant to the corrosive and/or erosive action of a process fluid with which it is put in contact, structured so as to be conveniently inserted in tube bundle equipment for thermal exchange operations under conditions of high pressure and high erosive and/or corrosive aggressiveness conditions.

The construction technique of high pressure equipment, whether it consists of decomposers, reactors, separators, boilers, and other apparatuses in which a thermal exchange is effected, normally comprises the assembly of a compact reinforcement body capable of tolerating the operating pressures, guaranteeing the maximum safety and duration with time of the mechanical specifications, equipped with the necessary passages for the inlet and outlet of the process fluids.

The most widely used material for the construction of the reinforcement body is carbon steel, due to its excellent combination of optimum mechanical properties, its relatively low cost and commercial availability. In order to maximize the exchange surface, a tube bundle is normally inserted inside the reinforcement body, terminating, at each end, with a plate or perforated drum facing a collection or fluid distribution chamber. The thermal exchange by means of a tube bundle is effected with a second fluid at a different temperature, generally with reduced aggressiveness characteristics, circulating in the other side of the exchanger, directly in contact with the outer surface of the tubes.

In chemical processes which treat highly aggressive fluids, at least one of the two surfaces of each tube and tube plate and at least a part of the internal surface of the reinforcement body are exposed to the direct contact with said fluids and their surfaces must therefore be adequately coated by a protective layer consisting of a suitable metal and/or metal alloy.

Some of the methods and equipment generally used for effecting thermal exchange in these cases are described, among other things, in the technical publication "Perry's Chemical Engineering Handbook", McGraw-Hill Book Co., $6^{th}$ Ed. (1984), pages 11-18. A typical example of this equipment is represented by the stripper inserted in the high pressure cycle of urea synthesis processes.

The problem of corrosion and/or erosion has been faced with various solutions in existing industrial plants, and others have been proposed in literature. There are in fact numerous metals and alloys capable of resisting for sufficiently long periods the extremely aggressive conditions produced inside equipment in processes involving highly corrosive fluids, such as for example in the synthesis of nitric acid and urea. Among these metals, lead, titanium, zirconium, tantalum, niobium and their alloys in various grades, can be mentioned, together with numerous stainless steels, such as for example, austenitic stainless steel (AISI 316L urea grade), stainless steel of the type 25/22/2 Cr/Ni/Mo, austenitic-ferritic stainless steels.

In spite of their higher cost with respect to stainless steels, metals such as titanium and zirconium, due to their high corrosion resistance and satisfactory mechanical properties, are frequently preferred for the production of tubes in high pressure thermal exchange equipment used in the synthesis of urea and nitric acid. Zirconium, in particular, is known for its excellent resistance to both chemical corrosion and the erosive action of process fluids with which it comes into contact, whereas titanium has a corrosion resistance substantially similar to that of zirconium, but a lower resistance to erosive action.

One of the problems which most frequently arise in the known art, when special materials are used in the designing and manufacturing of heat exchangers of the type described above, consists in the design and production of long-lasting sealing joints between the various surfaces exposed to corrosive action. It is well known in fact that weldings always represent preferential attack points for corrosive fluids, as the crystalline structure of the metal in the joining areas has a higher number of imperfections. The joining between different metals is also extremely problematical, as diffusion areas of one metal in another can be easily formed, together with instabilities due to the different chemical power, incompatibility in forming an alloy (such as, for example, between titanium or zirconium, on the one hand, and stainless steel or carbon on the other).

In the particular case of a tube bundle exchanger, such as for example, the stripper included in the high pressure (loop) cycle of the synthesis of urea, the solution to problems of corrosion is extremely complex due to the particular geometry of the equipment aimed at allowing distribution with maximum control and reproducibility of the temperatures and compositions of the fluids, especially when the thermal exchange is associated with chemical reactions. Also in this case, relatively successful attempts have been made to prevent corrosion with suitable coatings of the surface of the tube plate and other surfaces of the reinforcement body in contact with the corrosive fluids, but without succeeding in producing at reasonable costs equipment which is capable of enabling a further extension of the operating times without repair interventions.

U.S. Pat. No. 4,899,813 (assigned to the Applicant) describes the construction and use of vertical tube bundle equipment especially suitable for the high pressure stripping operation of the urea solution coming from the synthesis reactor. In order to prevent corrosion in the internal area of the tubes, where the thermal exchange and decomposition of the carbamate take place and where the chemical and erosive aggressiveness of the fluid is therefore at its maximum, a tube bundle is used, consisting of bimetallic tubes, i.e. consisting of an external part made of stainless steel, and an internal part, having a finer thickness (0.7-0.9 mm) made of zirconium, which mechanically adheres to the former but is not welded to it. The remaining part of the exchanger/stripper in contact with the urea solution, on the other hand, is constructed with the reinforcement body by means of the normal carbon steel technique, internally coated with a suitable stainless steel. Problems linked to corrosion and erosion inside the tubes are therefore solved, due to the excellent resistance of zirconium, without however running into difficulties associated with the formation of special steel/zirconium joints which cannot be efficiently welded directly to each other, and at the same time maintaining the production of the equipment economically reasonable.

In spite of the excellent results obtained by applying this latter technology, it has been found however that in certain areas of the exchanger, especially concentrated around the lower tube plate of the stripper and in the corresponding chamber, unpredictable corrosion phenomena still occur under extremely aggressive conditions of the fluids. The same problem can also arise with time in other tube bundle equipment operating under comparable aggressive conditions.

In tube bundle exchangers operating under extreme conditions, it has also been proposed to use tubes integrally made of a high performance metal, such as zirconium, niobium or tantalum, whereas the other surfaces of the exchanger, i.e. the surface of the tube plate and walls of the fluid collection and distribution areas, exposed to less aggressive conditions, can be produced with a coating consisting of a different more convenient and/or available material, such as titanium or stainless steel, but with lower performances in terms of resistance to corrosion and/or erosion. An analogous situation can be found in the case of maintenance or repair of pre-existing exchangers, in which the corroded or degraded tubes are substituted with new tubes made of more resistant materials than that used originally, preserving, on the other hand, the remaining surfaces of the equipment which are less degraded, in the same original material. In the latter case, the necessity of forming a long-lasting connection between different metals is even more pressing as it is practically impossible to intervene on the structure of the pre-existing plate with a new coating, due to the processing difficulties deriving from the large number of tubes per surface unit.

In both of the above cases, however, there is still the problem of the sealing connection of the tubes with the protective coating of the tube plate. The small maneuvering space available in the assembly of the tubes onto the plate, where they are positioned at a short distance from each other, complicates the use of special joining techniques, such as cold welding, solid welding, or by explosion or co-extrusion, often necessary for seal joining metals which are not compatible with traditional welding.

Patent application EP 1577632 describes a tube bundle exchanger suitable for the treatment of ammonium carbamate in plants for the synthesis of urea, in which the bundle consists of titanium tubes coated with a thin layer of zirconium on the side in contact with the corrosive fluid, and seal fixed on the tube plate by means of titanium-titanium welding. The zirconium layer is not necessarily extended for the whole length of the tubes, but can be arranged in the area of the tube subject to the most intense aggressive attack. Methods for obtaining said tubes can comprise hot welding or forging, to favour the formation of a metallurgic bond between the zirconium layer and the surface of the titanium. The solution proposed in this patent application however is not entirely satisfactory as far as the mechanical characteristics of the titanium tubes are concerned, which require greater thicknesses, thus reducing the efficiency of the thermal exchange. The problem becomes even more serious due to the fact that titanium has a lower thermal conductivity with respect to that of zirconium.

Patent application US 2006027628 proposes a different solution to this problem by the production of a tube bundle with tubes comprising an intermediate tubular metallic element, essentially consisting of an anti-corrosion high performance metal which is welded in the solid state to one or both ends, with a second double-layered coaxial tubular element in which one layer is of the same kind of metal as the intermediate element, and the other layer is suitable for welding with the metal of the plate coating.

No completely satisfactory answer is provided, however, for the request for pressure equipment comprising tubes in contact with extremely corrosive fluids, especially tube bundle equipment used in the urea synthesis cycle, having an excellent combination of high durability, design and construction simplicity, with a consequent cost reduction and respect for the most pressing safety criteria. Furthermore, some of the construction problems connected with maintenance, restoration and improvement interventions of existing tube equipment designed for high performances still remain partially unsolved.

During its continuous activity for improving its own technology, the Applicant has now found that the above demands and problems associated therewith are adequately satisfied, especially in relation to tube bundle equipment with tubes comprising an anticorrosive material different form stainless steel, adopting a particular type of tube configuration.

A first object of the present invention therefore relates to a bimetallic tube comprising a first tubular element $E_1$, consisting of a metal $M_1$ selected from Zr, Ta, Nb and Al or an alloy of said metals, suitable for resisting the aggressive action of a process fluid in contact with its internal surface, homogeneously extending for the whole of its length, and at least a second tubular element $E_2$, consisting of a second metal or alloy $M_2$ different from $M_1$, circularly arranged outside said first tubular element, in a position close to one of its ends, for a section less than a third of the length of the tube itself, and seal fixed with said element $E_1$.

A second object of the present invention relates to a method for the manufacturing of the above bimetallic metal starting from a tube comprising for the whole of its length at least one tubular element $E_0$ consisting of said metal $M_1$, comprising the following steps:

a) arrangement of the outer surface of at least one of the ends of $E_0$, for a length sufficient for receiving a second tubular element $E_2$, so as to produce a suitable insertion seat, preferably having an outer diameter of the tube smaller than the initial diameter;

b) positioning of a tubular element $E_2$, having a length equal to or less than a third of the length of $E_0$, consisting of a metal $M_2$ different from $M_1$, arranged as a ring around at least a segment of said insertion seat;

c) joining of the surfaces of the metals $M_1$ and $M_2$, for at least a part of the contact surface between said tubular elements $E_0$ and $E_2$, so as to form a seal joint, preferably forced, on the whole perimeter of the bimetallic tube thus obtained.

A further aspect of the present invention relates to tube bundle equipment suitable for efficiently effecting thermal exchange, under high pressure and temperature conditions, between at least two fluids, one of which, having characteristics of high aggressiveness under the process conditions, is in contact with the internal walls of the tubes of the bundle, comprising a hollow body or reinforcement body, suitable for tolerating the operating pressures and consisting of a material subject to corrosion by contact with said highly aggressive fluid, in whose central area a tube bundle is fixed, supported at the ends by two tube plates hinged onto the reinforcement body and coated with a metal $M_3$ resistant to corrosion on the surface in contact with said corrosive fluid, characterized in that said tube bundle comprises at least one bimetallic tube according to the present invention inserted in the tube plate so that at least one of the ends comprises a seal welding between the metal $M_2$ of said tubular element $E_2$ and said metal $M_3$ of the coating of the tube plate.

Yet another object of the present invention relates to a method for the manufacturing of said equipment and the application of the method itself in the variant for effecting the restructuring or repair of pre-existing equipment with the introduction of said bimetallic tube.

Other objects of the present invention will appear evident for experts in the field in the following present description.

The term "alloy" as used herein with reference to a certain metal, refers to a metallic composition comprising said metal in a quantity of at least 40% by weight.

The term "corrosion" and "corrosiveness" as used in the present description and claims with reference to the action of a process fluid in contact with a surface of a certain metal or alloy, in intended in the general meaning of removal or modification of the properties of the material forming the surface and comprises both the corrosion action deriving from a chemical attack of the surface and also the erosive action deriving from a physical removal process due to impact forces, friction and cutting.

In accordance with the present description, the term "corrosion resistant" referring to a material with respect to a fluid under certain process conditions, defines a material which has a corrosion index lower than 0.1 mm/year measured according to the regulation ASTM A 262 dossier C (HUEY TEST). Corrosion indexes for materials of normal industrial use are cited in various handbooks known to experts in the field, such as, for example, in tables 23-22 to 23-24, of the above-mentioned "Perry's Chemical Engineering Handbook", under the item Ammonium Carbamate.

The term "force welding" and "seal welding", as used in the present description and claims, refer to the following definitions taken from the regulations ASME VIII Div. 1 UW20:
 a force welding is a welding with characteristics which are such as to satisfy the project prescriptions, on the basis of the mechanical characteristics and stress deriving from expansion of the welded parts;
 a seal welding is effected with the aim if avoiding losses and its dimensions are not determined on the basis of the loads previously expressed for force weldings.

The term "homogeneous" and "homogeneously", as used herein with reference to a tubular element $E_1$, indicate the lack of any discontinuity deriving from welding or another seal or force joining method between different parts of the metal $M_1$. This definition does not exclude that the section or thickness of said tubular element can be different in various regions of the tube.

The term "metallurgically attached" as used herein with reference to the interaction between two metallic bodies joined to each other (such as, for example, any two bodies selected from a tube, a tubular element, a metallic coating, a plate or a metallic layer), indicates the presence of a contact surface or section between said metallic bodies, wherein the respective constituents (which can be the same metal or different metals) are joined directly or indirectly to each other so as to form a joint with characteristics of mechanical and detachment resistance in the same order of magnitude as at least one of said metals. Examples of metallurgically attached bodies according to this definition are those in which the respective metals are joined by molten welding, with or without a melting rod, brazing, cold welding (friction welding, explosion welding), co-extrusion, hot-drawing and analogous techniques.

The tube according to the invention is not limited to a particular form of its transversal section, which can therefore be circular, ovoidal, rectangular or having other shapes, possibly also irregular, according to application demands. For reasons of processing and installation, and also for reaching the best mechanical characteristics, a circular section is preferred for the whole length of the tube. Furthermore, the tube according to the present invention is not limited to a linear form in a longitudinal sense, but can also have arched, elbow or flexed forms, even if the linear form is most commonly used for the sake of manufacturing and installation simplicity.

For its numerous applications, the dimensions of the tube in question can vary within wide limits. For an optimum performance in the presence of a high pressure differential, usually ranging from 2 to 30 MPa, between the outer surface (mantle side, in contact with a thermal fluid, normally with low, medium or high pressure vapour) and internal surface (in contact with the corrosive fluid), the internal diameter (or maximum width of the section) of the tube ranges from 5 to 150 mm, preferably from 10 to 100 mm, and the thickness of the tubular element $E_1$ in the central area of the tube, where the element $E_2$ is absent, preferably varies within a range of 1 to 15 mm, preferably from 1.5 to 10 mm, except for when further tubular elements concentric to $E_1$ are present.

Preferred metals for the element $E_1$ are zirconium and niobium, especially zirconium and its alloys comprising at least 60% of Zr, such as Zircalloy© and Zircadyne©, due to the excellent resistance to both corrosion and erosion, and its satisfactory commercial availability.

The tube according to the present invention can also comprise, in addition to said elements $E_1$ and $E_2$, other tubular elements forming corresponding layers arranged concentrically and externally to the element $E_1$, and extending for the whole length of the tube or sections having a shorter length. The tubular element $E_1$, in this case, can conveniently have thicknesses even less than 1 mm, for example ranging from 0.3 to 5 mm. Around the element $E_1$ formed by the metal $M_1$, in this case, there is one or more layers having a tubular form integral with and adjacent to $M_1$, consisting for example of a third metal or alloy (for example stainless steel) suitable for tolerating the pressure differential, but conveniently less costly, which can be metallurgically attached to the metal $M_1$ or simply in contact with it forming a structure in which $E_1$ is pressure supported. The metal of said one or more additional layers is preferably selected from metals or alloys included in those defined above in relation to the metal $M_2$, but is not necessarily the same metal which forms the tubular element $E_2$, even if it is preferable for said third metal to form metallurgically attached weldings or joints with the metal $M_2$.

Figure 3:
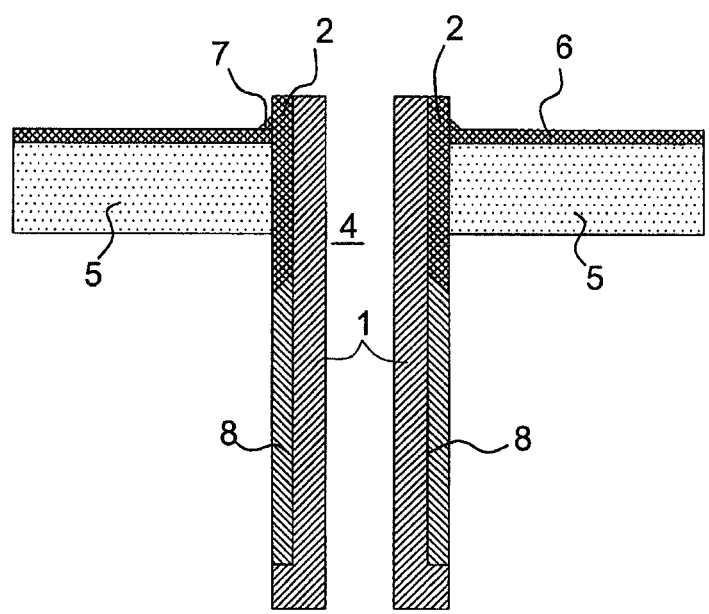

A non-limiting example of a multilayer tube with several superimposed tubular elements according to the present invention, is schematically represented in FIG. 3. In this case, the further tubular element is adjacent to the element $E_2$, and extends in the central section of the length of the tube, but also included in the present invention is the solution in which the further tubular element extends for the whole length of $E_1$, and the element or elements $E_2$ are inserted at the ends of the tube, arranged circularly on the surface of said further tubular element.

The length of the tube according to the present invention can vary within wide limits, in relation to the dimensions of the equipment where it is used. In general, the length is at least 5 times greater than the diameter and preferably varies from 1 to 20 meters, more preferably from 2 to 10 meters. Whereas the first tubular element $E_1$ substantially extends for the whole length of the tube, the second element $E_2$ extends to one or both ends, or close to these, for a length preferably ranging from 0.2 to 20%, more preferably from 1 to 10% of the total.

The thickness of $E_2$ can be conveniently selected in relation to the mechanical characteristics and operating conditions projected for its use. Normal thicknesses can vary from 1 to 15 mm, preferably from 2 to 10 mm.

Said element $E_2$ consists of a metal or alloy $M_2$ different from $M_1$ and suitably selected in relation to the constituents of the equipment in which the bimetallic tube is included. In general $M_2$ is advantageously selected from metal or alloys compatible with the welding with the protective coating of the equipment in the areas in contact with the corrosive fluid close to the connection of the tube. In the case of an exchange of the stripper type for urea, for example, said metal $M_2$ is preferably selected from titanium or one of its alloys, or stainless steel urea grade, in relation to the metal which forms the coating of the distribution and collection chamber of the stripper. Typical, non-limiting examples of these metallic materials are, in addition to titanium and its relative alloys, AISI 316L steels (urea grade), INOX 25/22/2 Cr/Ni/Mo steel, special austenitic-ferritic steels.

Particularly preferred $M_2$ metals are titanium and its alloys resistant to corrosion on the part of ammonium carbamate.

According to the present invention, as described in more detail hereunder, said element $E_2$ can be conveniently seal welded with the coating of the tube plate in a heat exchanger. As commonly used in the art, said welding preferably also forms the force attachment area of the tube on the plate, resistant to the mechanical stress deriving from the pressure differential. In relation to the use of the exchanger and its structure, the element $E_2$ can be conveniently positioned so that one of its ends coincides with the end of the tube, or it can be circularly inserted around the element $E_1$ in a position close to the mouth of the tube so that the latter only consists of the element $E_1$ (as represented by the element 3 in FIG. 1B).

According to a preferred embodiment, said element $E_2$ homogeneously extends for the whole length of the terminal section of the bimetallic tube, forming a continuous layer up to its ends.

According to another embodiment of the present invention, said element $E_2$ can, on the other hand, protrude for a short distance, preferably from 0.1 to 15 cm, beyond the length of the element $E_1$.

The element $E_2$, moreover, can also have an outer diameter greater than that of the bimetallic tube in the central area, in order to form a wider and supporting joining surface for the possible seal welding on the tube plate. Said element $E_2$ preferably has a thickness ranging from 0.5 to 8 mm, more preferably from 1 to 4 mm, adequate for forming the base for the welding of the bimetallic tube on the respective support, for example on the tube plate of a heat exchanger or decomposer.

In a particularly preferred embodiment, the tube of the present invention comprises a tubular element $E_1$ made of pure zirconium or an alloy comprising at least 60% of zirconium, and at least one tubular element $E_2$ made of titanium or one of its alloys, arranged circularly around $E_1$ close to an end of the tube, and metallurgically seal and preferably force attached thereto, on the contact surface and welded at least in the area closest to the mouth of the tube.

According to a particularly preferred embodiment, said bimetallic tube comprises two tubular elements $E_2$, of the same material or different materials, each positioned close to one of the ends of the tube itself. This configuration is convenient in the production of tube bundle exchangers, in which both of the tube plates comprise $M_3$ metallic coatings different from the metals or alloys included in the definition of $M_1$ which are adopted for forming the internal wall of the bimetallic tubes.

The tube according to the present invention can be produced according to the usual metallurgic techniques, suitably adapted to each case by experts in the field. The Applicant has now found however a particular original and efficient method for the production of said tube, which represents a second object of the present invention, as already mentioned above.

In step (a) of said method, a segment of the external surface of the tube $E_o$, positioned at one or both ends, is subjected to treatment for allowing it to house a second tubular element $E_2$ consisting of the metal $M_2$. The treatment can consist of a surface cleaning of the segment of interest in order to obtain an efficient adhesion with the surface of the element $E_2$, or it can include a treatment for the removal of a thin layer of metal from the surface, for example by abrasion or turning, in order to obtain an insertion seat having a diameter (or equivalent dimension, when the tube is not circular) smaller than the original one, preferably from 0.1 to 2 mm smaller (or even greater according to the geometrical details), which can better house the element $E_2$. Suitable cleaning and abrasion techniques are those normally known in the art for metals of the $M_1$ type.

The surface preparation technique is effected on a segment of the tube having a length suitable for the dimension of the element $E_2$ and relative assembly techniques. In general, it is preferable to prepare an insertion seat having a length from 1 to 20 mm greater than the extension of the superimposition between $E_1$ and $E_2$ in the bimetallic tube.

In step (b) of the present manufacturing method, the tubular element $E_2$ is positioned on the insertion seat prepared according to step (a). The element $E_2$, for this purpose, if preformed, has an inner diameter corresponding to that of the insertion seat, with the exception of possible small deformations following the inserting phase, when effected under stress or compression.

In the following step (c), the surfaces of the elements $E_1$ and $E_2$, in contact with each other, are processed in order to obtain a sealing joint, capable of supporting the projected axial stress on the whole surface perimeter, with the formation of a metallurgic bond. This connection can be effected by means of a welding, according to the known techniques for welding metals of the $M_1$ type to those of the $M_2$ type, for example $T_1$ with Zr, or Al with Zr, etc. or it can be obtained by explosion (so-called "explosive bonding", according to the usual English term), by means of vacuum and/or hot drawing, or by means of another adhesion and connection technique of different metals, so as to produce a metallurgic bond between the surfaces of the two elements $E_1$ and $E_2$, consequently guaranteeing a stable sealing under the operating conditions of the metallic tube. Even if not necessary, it is preferable, according to the present invention, for the connection zone (i.e. the area where the surfaces of $M_1$ and $M_2$ are seal adhered) to be extended onto the largest surface possible, more preferably coinciding with the whole contact and superimposing area between $M_1$ and $M_2$.

According to a particular embodiment of said method, the bimetallic tube of the present invention can be produced by arranging a welding deposit of the metal $M_2$ in the insertion area prepared as in (a), subsequently effecting the necessary finishing operations. This variation allows steps (b) and (c) of said method of the present invention, to be effected contemporaneously.

Other variations in the above method and other manufacturing methods of said bimetallic tube can be effected by experts in the field, by adapting knowledge in the area to the desired embodiment. This includes the possibility of producing a bimetallic tube having a longer length with respect to the operating length and subsequently removing the exceeding parts.

According to a further aspect of the present invention, said bimetallic tube is produced so that the element $T_1$ and the element $T_2$ are attached to each other, preferably forming a metallurgic bond, along a contact surface having a truncated-conical profile, rather than cylindrical. In this case step (a) of the method claimed for the manufacturing of said bimetallic tube comprises the production, for example by means of turning, of an insertion seat on $E_0$ having a truncated-conical shape, preferably with length of 20 to 50 mm and a progressive and continuous reduction in the diameter of $E_o$, along the truncated-conical profile, for a total of 0.5 to 6 mm, preferably from 1 to 3 mm. An element $E_2$, whose inner surface is correspondingly truncated-conically shaped in order to fit and be attached to the surface of $E_o$, is then superimposed and fixed on said conical seat, in accordance with steps (b) and (c) of the present method, respectively.

The tube according to the present invention can be used in several industrial chemical processes, due to its original and advantageous characteristics which allow a seal connection to be obtained between its ends and the anti-corrosion layer of at least one part of the equipment wherein said tube emerges, maintaining at the same time a high resistance to corrosion/erosion of the process fluids, along its whole length, due to the presence of an integral tubular element $E_1$, consisting of a very high performance material, with no joining areas, or, in any case, non-homogeneous on the surface prepared for contact with the corrosive fluid, in connection with an element $E_2$, metallurgically bound to $E_1$, prepared for seal insertion on the outlet support, for example a tube plate, forming an assembly which is resistant to corrosion, as a whole, under standard process conditions.

It can therefore be used, for example, as a connection line between equipment in which corrosive fluids flow under pressure, or, preferably, for the manufacturing of the tube bundle of a heat exchanger suitable for processing corrosive fluids under medium to high pressures. A particularly preferred use is for the production of heat exchangers in which chemical reactions or phase transitions also take place, comprising the formation of several phases in contact with each other, in which both the corrosive action due to oxidative chemical attack and the erosive action due to the turbulence and friction against the walls are considerable. Equipment of this type include carbamate strippers in plants for the synthesis of urea.

This latter equipment operates under pressures normally ranging from 1 to 40 MPa and temperatures between 70 and 300° C., in the presence of mixtures containing water, ammonia, carbon dioxide and ammonium carbamate, which is the condensation product of said compounds, according to the reaction:

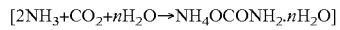

$$[2NH_3+CO_2+nH_2O \rightarrow NH_4OCONH_2 \cdot nH_2O]$$

The operating conditions are preferably a pressure of 12-25 MPa and a temperature of 120 to 240° C.

In normal industrial plants for the production of urea, to which the present invention particularly refers, the above-mentioned equipment included in medium or high pressure sections, normally contains volumes ranging from 2,000 to 100,000 liters.

A further object of the present invention therefore relates to equipment comprising a series tubes for heat exchange between two fluids (tube-bundle heat exchanger), wherein the inner wall of said tubes is suitable for contact with a fluid having characteristics of high corrosion with respect to normal stainless steels (corrosion index>0.2 mm/year), characterized in that at least one, preferably a portion of said tubes, consists of the bimetallic tube in accordance with claim 1 of the present invention. More preferably, all of said tubes are bimetallic tubes, in accordance with the present invention.

The pressure equipment according to the present invention can have various geometrical forms, both internally and externally, depending on the functions for which it is used. It is preferably constructed according to the typical criteria of tube-bundle heat exchangers for high or medium pressures. It therefore normally has a cylindrical form, with two semi-spherical caps (heads) at the ends of the cylinder, for a better distribution of the pressure. Openings are suitably produced in the semispherical caps and along the cylindrical body, for the inlet and outlet of fluids, the introduction of possible sensors and an opening for inspections (manhole). According to use, it can be horizontally or vertically oriented, the latter as in case of the urea process strippers mentioned above.

The outer wall of the equipment, which almost entirely supports the pressure thrust, consists of a thick wrapping made of a high mechanical performance metal or alloy, normally carbon steel, also called reinforcement body, having a thickness calculated in relation to the pressure to be tolerated, normally ranging from 20 to 350 mm. In high pressure exchangers, the outer wall can suitably have different thickness according to the pressure to be effectively tolerated. Normally, the central cylindrical area, in contact with the saturated vapour at pressures ranging from 0.2 to 5 MPa, preferably has thicknesses ranging from 20 to 100 mm, whereas the wall of the caps and of the cylinder close to this, which has to support higher pressure from the process fluids, proportionally has higher thicknesses, preferably from 80 to 300 mm. The outer wall can consist of a single layer or several layers of carbon steel, assembled according to any of the known techniques.

The area comprising the series of tubes, or tube-bundle, can be distinguished inside the equipment, as they are normally grouped parallel to each other, inserted on two septa or plates suitably positioned transversally to the main axis of the equipment, also including a flat element suitable for tolerating the pressure difference, normally made of carbon steel, with a thickness of 40 to 500 mm. In the most common case, each of the two plates are situated close to one of the two caps and define a central volume having an essentially cylindrical geometry. Each plate is seal fixed on the circular wall by welding, so that there can be no exchanges of material between contiguous cavities. Alternatively, the tube-bundle can be U-curved and connected to the same plate, defining on the same an inlet and an outlet area of the fluid, separated by a septum, but substantially at the same pressure.

In the tube-bundle equipment object of the present invention, a series of tubes are fixed between two tube-plates or sections of the same plate, which are suitably perforated so as to allow the passage of a fluid between the two cavities at the ends of the tubes. A second fluid, normally a water/vapour mix, is circulated in the intermediate cavity, usually on the mantle side, to effect thermal exchange through the tube wall.

The number of said tubes varies according to the project specifications, but normally ranges from a minimum of 2 to about 10000 for larger equipment. There are preferably from 100 to 6000 tubes, and their diameter varies from 10 to 100 mm. The length of the tubes normally coincides with the length of the central body of the equipment and preferably ranges from 1 to 20 m, their form is generally linear, but tubes comprising curved or toroidal parts are not excluded and the thickness can vary, depending on the load to be supported and diameter, from 2 to 25 mm. Intermediate septa (also called "baffles") can be positioned in the intermediate cavity to support the tubes. These are normally made of carbon steel and have a thickness of a few millimeters, as they do not have to support any pressure thrust.

According to a preferred aspect of the present invention, all the tubes of said thermal exchange equipment are bimetallic tubes according to the present invention.

The process fluid with characteristics of high corrosiveness, for example an aqueous solution of carbamate and urea, or a solution of concentrated nitric acid, is situated inside the caps positioned at the end of the equipment, and flows inside said tubes, forming a higher pressure fluid. Saturated water vapour is normally fed into the intermediate cavity at pressures varying from 0.2 to 5 MPa, which, on condensing, releases the necessary quantity of heat, for example for decomposing the carbamate.

In the equipment in question, the bimetallic tubes are conveniently force welded onto the tube plate in order to guarantee the necessary mechanical and sealing stability. The tube plate normally consists of a thick layer or several layers of carbon steel, perforated for the passage of the tubes, and one or more anti-corrosion coating layers on the side in contact with the process fluid. At least one of said anti-corrosion layers preferably consists of a metal or alloy compatible with the metal or alloy forming the element $E_2$ of the tube of the present invention, i.e. with said metal or alloy, it can form a welding or seal connection with satisfactory mechanical properties and corrosion resistance.

The tube plate, for example, is coated on one or both sides of the tube bundle with a layer of titanium or titanium alloy, possibly fixed by explosion bonding with an intermediated layer of stainless steel. Said layer is force and seal welded with the element $E_2$ of each bimetallic tube close to the outlet on the surface, optionally allowing a short section of $E_2$, for example from 1 to 5 cm, to protrude from the surface of the plate. The thickness of the anti-corrosion layer is suitably selected so as to resist corrosion for an adequate period of time, it preferably varies from 2 to 20 mm, preferably from 3 to 15 mm.

Suitable techniques for effecting the welding between the anti-corrosion layer of the plate and the end of the tube are generally known to experts in the field. These are special but well-known techniques for the joining of parts made of titanium or titanium alloys.

The bimetallic tube according to the present invention can be advantageously used for totally or partly substituting the tubes of a tube bundle in a pre-existing heat exchanger.

According to a further embodiment of the present invention, the tube in question can be conveniently used in the substitution of one or more tubes of a tube bundle of a pre-existing heat exchanger, according to normal practice in maintenance or modernization interventions (or revamping), generally applied in industrial plants. Said revamping operation can achieve the double objective of restoring the functionality of the exchanger by replacing pre-existing tubes which for some reason no longer function and/or are no longer sufficiently integral (for example, due to thinning or perforation deriving from corrosion, which have caused their closure), and also improving the performances and safety of the equipment by substituting pre-existing tubes produced with less resistant materials.

A further object of the present invention therefore relates to the repair or improvement of the performances of tube-bundle chemical equipment suitable for the treatment of a corrosive fluid, wherein said fluid is in contact with the internal part of the tubes forming the tube bundle, comprising the substitution of at least one of said tubes with a bimetallic tube according to the present invention.

The equipment on which said maintenance or modernization is effected is preferably a heat exchanger, more preferably a stripper of the urea synthesis cycle, whose tube plate is coated with titanium or one of its alloys. According to a preferred embodiment, the method according to the present invention comprises the removal of at least one of the pre-existing tubes, cleaning and boring of the cavities thus formed, the insertion of a bimetallic tube according to the present invention, having a suitable length, in each cavity, positioning the mouth of each tube so as to protrude for a short section, normally from 0.3 to 5 cm, and finally welding the coating of the tube plate with the outer surface of the element $E_2$ of each tube.

The enclosed figures provide some illustrative and non-limiting examples in scale of embodiments of the present invention. Parts having the same function in the figures are indicated with the same number.

FIG. 1 schematically represents a view of two longitudinal sections of tubes according to the present invention, respectively having:

(A) an element $E_2$ positioned at only one end
(B) an element $E_2$ positioned at each end, above, up to the terminal mouth of the tube, below, in a slightly withdrawn position, allowing a section homogeneously consisting of the metal $M_1$ of the element $E_1$ to protrude.

Figure 2:
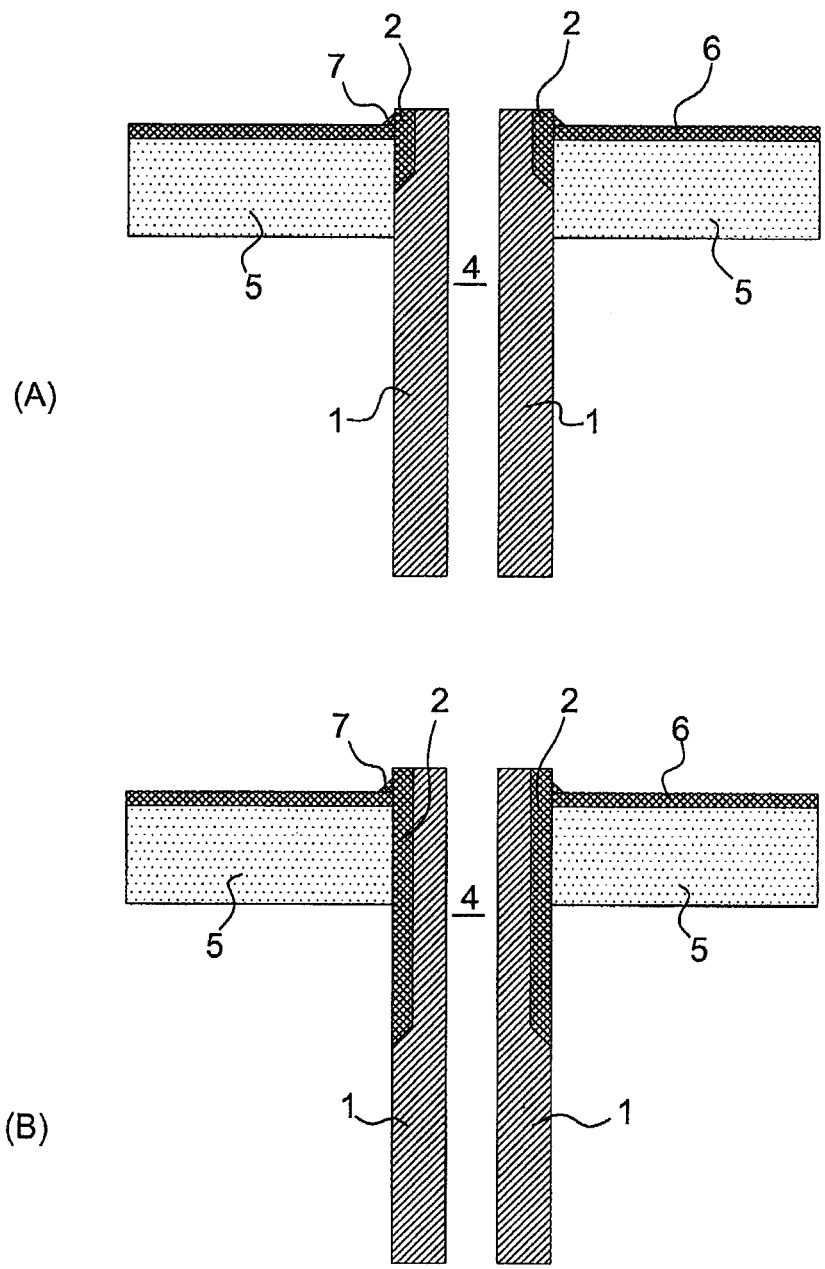

FIG. 2 schematically represents two examples of sectional views of an insertion detail on a tube plate of the tube according to the present invention, in which, respectively:

(A) the element $E_2$ is positioned in the terminal area of the tube, close to the welding with the coating of the plate;
(B) the element $E_2$ extends for an external section along the axis of the tube, beyond the thickness of the tube plate.

FIG. 3 schematically represents an analogous detail to that of FIG. 2, but relating to a tube according to the present invention, consisting, in the intermediate section between the ends, of two coaxial layers of different metals, of which the innermost is the tubular element $E_2$.

For the sake of greater simplicity and figurative clarity of the details, the proportions between the different elements appearing in the figures do not correspond to the actual values.

In the following description, relating to some illustrative and non-limiting examples of tubes and installations according to the present invention, the orientation of the figures and relative position of the different parts to which reference is made is neither representative nor limiting of the configurations of the objects described in the practical embodiment of the invention.

With reference to FIG. 1(A), the bimetallic tube according to the present invention comprises a homogeneous and continuous tubular element 1, having a cylindrical form, which extends for the whole length of the tube and consisting of the metal $M_1$ as defined above, preferably zirconium or one of its alloys. Said element, obtained by means of one of the normal tube-manufacturing techniques suitable for tolerating high pressures, in addition to providing the desired resistance to corrosion of the fluid in contact with the internal wall, exerts the function of fluid containment, entirely sustaining the pressure force for most of the length of the tube, and is therefore produced with an adequate thickness for the process pressure. In the upper part of said bimetallic tube, the thickness of a section of the wall of the element 1 is hollowed, for a length ranging from 2 to 10% of the whole tube, to concentrically adapt the second tubular element 2, consisting of the metal $M_2$, preferably titanium or one of its alloys, on the outer surface. The metals $M_1$ and $M_2$, specifically zirconium and titanium, are metallurgically seal bound on the contact surface between the elements 1 and 2. The two elements 1 and 2 are concentrically arranged as far as the upper mouth of the tube (A). The thickness of the element 2, which is this case partly contributes to contrasting the internal pressure of the tube, preferably ranges from 20 to 50% of the thickness of 1.

With reference to FIG. (B), the bimetallic tube comprises a homogeneous and continuous tubular element 1, consisting of the metal $M_1$, having a cylindrical form, which extends for the whole length of the tube, on whose upper part there is a second tubular element 2, consisting of the metal $M_2$, analogously to what is indicated in FIG. 1(A). In the lower segment of said tube, the element 1 is shaped so that the outer surface comprises a cavity for a length preferably ranging from 2 to 10% of the whole tube, produced so that a small final part of the element 1, for about 0.5-3% up to the mouth of the tube, remains unaltered with respect to the central section thereof. The tubular element 3 made of titanium or one of its alloys, preferably metallurgically attached to the element 1 by means of one of the techniques listed above, is arranged in said cavity concentrically with respect to the element 1.

With reference to FIG. 2(A), the bimetallic tube according to the present invention is represented by the combination of the tubular element 1, made of the metal $M_1$, of which only a portion is represented, the element 2, made of the metal $M_2$, positioned in the terminal part of the tube, and the duct 4 for the passage of the fluid, delimited by the tube itself. Said tube is fixed onto the support consisting of the tube plate of a typical heat exchanger which treats a highly corrosive fluid, under pressure, such as, for example, a stripper of ammonium carbamate in the industrial synthesis process of urea. In this case, the tube plate comprises the reinforcement body 5, normally a perforated sheet made of carbon steel, having a high thickness, suitable for contrasting the pressure thrust, and the anticorrosive coating 6, consisting of a corrosion-resistant metal, preferably such as to form long-lasting seal connections with $M_2$, by means of welding or another method. In the example represented in FIG. 2(A), the coating 6, which, if necessary, can also comprise several metallic layers, according to what is already known in the art, for example, WO03/095060, is seal and force attached, preferably by means of a welded joint 7, onto the tubular element 2 present externally on the outlet of the bimetallic tube.

Different variants of the example represented in FIG. 2(A) are possible, all equally included within the scope of the present invention and not shown in the figure as they can derive from experts in the field applying the known art. It is possible, for example, to insert one or more peep-holes into the plate and other elements suitable for improving the safety of the equipment.

FIG. 2(B) shows a variant of FIG. 2(A), in which the tubular element $E_2$ of the tube according to the present invention (again indicted with 2 in the figure), extends beyond the thickness of the tube plate 5, so that the latter is in only contact with the metal M of the outer layer.

In a tube-bundle exchanger comprising the technical solution represented in FIGS. 2(A) and 2(B), the seal connections of the tube with the tube plate can be effected between similar metals and compatible with the welding, as the element $E_2$, in the metal $M_2$, is arranged on each tube by connecting techniques with the element $E_1$ which can be effected directly on the tube before insertion onto the tube plate, fully satisfying the strict safety requirements envisaged for pressure equipment of this type.

In this way, it is not necessary to effect any connection between the metal $M_1$ and the metal forming the coating of the plate, making the production of the exchanger much easier and more economical when said metals cannot be easily welded to each other, or form a welding with a lower corrosion resistance to that of each metal. According to the present invention, the connection between $E_1$ and $E_2$ can in fact be easily effected with the techniques described above, in environments and with suitable equipment, without drawbacks due to encumbrance and limited operating spaces typical of a tube plate, where the high space density of the tubes (on an average at a distance of 3 to 5 cm from each other) and the overall dimensions of the unit make it impossible to use techniques different from traditional welding.

FIG. 3 shows a further variant of an assembly of the same type represented in FIG. 1. In this case, however, a tube can be observed, consisting of a continuous and homogeneous tubular element 1, corresponding to the tubular element $E_1$ of the present invention, which has a lesser thickness than that of the previous case and it is therefore preferably inserted, for most of the section between the ends, for a portion of 80 to 95% of the total length, inside a tube 8 consisting of a more economical and easily available metal or alloy than $M_1$, having good mechanical properties but a lower resistance to corrosion. In the area close to the end, said tube 8 is substituted by the tubular element 2, consisting of $M_2$, according to the procedures described above with reference to FIG. 2. The metals of the element 2 and element 8 preferably form a connection in the contact area between each other, which in this case does not require particular corrosion resistance, as it is normally in contact with pressurized vapour.

For the sake of graphical simplicity, FIGS. 2(A), 2(B) and 3 schematically represent only one of the insertion areas of the end of the tube into the tube plate, as indicated by the sketch of the drawing of the tubes on the opposite side of the tube plate.

Embodiments of the present invention, different from those described above, can be effected by experts in the field with adaptations to various applicative demands, forming obvious variants, in any case included in the scope of the subsequent claims.

The invention claimed is:
1. A metallic tube assembly, comprising:
  a tube plate and a metallic tube configured to resist the corrosive action of a process fluid, said metallic tube comprising:
  a first tubular element which homogeneously extends for the whole length of the metallic tube, defines the internal surface of the metallic tube, consists of a first metal material selected from the group consisting of zirconium, niobium, and alloys of zirconium and niobium; and is provided with a recessed seat at least in proximity of one of its opposite ends along the external surface of the first tubular element;
  a second tubular element which consists of a second metal material selected from the group consisting of titanium, titanium alloys, and urea grade stainless steel; the second tubular element being seal attached to the first tubular element by a metallurgical bond extending over a first contact area of the first tubular element and the recessed seat,
  a third tubular element which consists of a third metal material different from the first metal material and the second metal material; the third tubular element being seal attached to the first tubular element by a metallurgical bond extending over a second contact area of the first tubular element and the recessed seat, the third tubular element having a first end and a second end, the first end being seal attached to the recessed seat,
  wherein the second tubular element has first and second ends, the first end distal to the tube plate and the second end proximal to the tube plate, wherein the first end is seal attached to the second end of the third tubular element,
  wherein the metallic tube is connected to the tube plate with a metallurgical bond such that the end of the metallic tube is substantially perpendicular to the tube plate and penetrates the tube plate, and
  wherein the second tubular element of the metallic tube penetrates the tube plate and extends beyond the tube plate to which the metallic tube is fixed, and the second tubular element has a length such that the tube plate is not in direct contact with the first tubular element.
2. The metallic tube assembly as claimed in claim 1, wherein the recessed seat has a length less than a third of the length of the first tubular element.

3. The metallic tube assembly as claimed in claim 1, wherein said first metal material is selected from a group consisting of zirconium or alloys with at least 60% by weight of zirconium.

4. The metallic tube assembly as claimed in claim 1, wherein the second metal material is selected from a group consisting of titanium or titanium alloys.

5. The metallic tube assembly as claimed in claim 1, wherein the central section of the first tubular element has a thickness ranging from 1 to 15 mm.

6. The metallic tube assembly as claimed in claim 1, wherein the second tubular element has a length ranging from 0.2 to 20% of the total length of the tube.

7. The metallic tube assembly as claimed in claim 1, wherein the second tubular element has a uniform thickness ranging from 1 to 15 mm.

8. The metallic tube assembly as claimed in claim 1, wherein the recessed seat has an external diameter smaller than a largest diameter of the first tubular element.

\* \* \* \* \*